(12) United States Patent
Schroeder

(10) Patent No.: US 11,108,201 B2
(45) Date of Patent: Aug. 31, 2021

(54) MODULAR SYSTEM, COMPRISING ELECTRICAL CONSUMING UNITS AND AN ELECTRICAL CONNECTION UNIT

(71) Applicant: Harbour Star International Ltd., Kowloon (HK)

(72) Inventor: Thorsten Schroeder, Mount Davis Village (HK)

(73) Assignee: Harbour Star International Ltd., Kowloon (HK)

( * ) Notice: Subject to any disclaimer, the term of this patent is extended or adjusted under 35 U.S.C. 154(b) by 0 days.

(21) Appl. No.: 16/734,553

(22) Filed: Jan. 6, 2020

(65) Prior Publication Data
US 2020/0227874 A1 Jul. 16, 2020

(30) Foreign Application Priority Data
Jan. 15, 2019 (DE) .......................... 202019100202.6

(51) Int. Cl.
*H01R 25/00* (2006.01)
*H01R 13/642* (2006.01)
(Continued)

(52) U.S. Cl.
CPC .......... *H01R 25/006* (2013.01); *H01R 13/642* (2013.01); *A47J 27/21008* (2013.01);
(Continued)

(58) Field of Classification Search
CPC ................. H01R 25/006; H01R 13/642; A47J 27/21008; A47J 29/00; A47J 31/44
(Continued)

(56) References Cited

U.S. PATENT DOCUMENTS

| | | | | |
|---|---|---|---|---|
| 2,988,655 A | * | 6/1961 | Rudolph | ............... H01R 25/00 307/114 |
| 5,137,455 A | * | 8/1992 | Moerbe | .................. B60R 11/00 137/884 |

(Continued)

FOREIGN PATENT DOCUMENTS

| | | |
|---|---|---|
| CN | 201601348 | 10/2010 |
| CN | 107732610 | 2/2018 |

(Continued)

*Primary Examiner* — Alexander Gilman
(74) *Attorney, Agent, or Firm* — Sand, Sebolt & Wernow Co., LPA

(57) ABSTRACT

A modular system comprising electrical consuming units and an electrical connection unit. The connection unit has a contact plug for plugging into a power outlet and for electrical connection with a particular cable connecting an electrical terminal and distribution strip as well as one connecting the terminal and distribution strip to the contact plug. The consuming units have first connection elements for mechanical and electrical connecting to second connection elements on the terminal and distribution strip. The first connection elements are geometrically different depending on a maximum electrical power consumption of the respective consuming unit. The second connection elements are likewise geometrically different such that selected first connection elements cannot be connected to selected second connection elements. The type and number of second connection elements are determined such that a total maximum electrical power consumption of all electrical consuming units connected simultaneously is limited to a predefined maximum value.

9 Claims, 1 Drawing Sheet

(51) Int. Cl.
  *A47J 27/21* (2006.01)
  *A47J 29/00* (2006.01)
  *A47J 31/44* (2006.01)
  *A47J 36/00* (2006.01)
  *A47J 37/08* (2006.01)

(52) U.S. Cl.
  CPC ............... *A47J 29/00* (2013.01); *A47J 31/44* (2013.01); *A47J 36/00* (2013.01); *A47J 37/0871* (2013.01); *A47J 2201/00* (2013.01)

(58) Field of Classification Search
  USPC .......................................................... 439/502
  See application file for complete search history.

(56) References Cited

U.S. PATENT DOCUMENTS

| | | | | |
|---|---|---|---|---|
| 5,885,109 | A * | 3/1999 | Lee | H01R 13/514 439/131 |
| 5,899,761 | A * | 5/1999 | Crane | H01R 25/00 439/142 |
| 6,663,435 | B2 * | 12/2003 | Lincoln, III | H01R 25/003 439/115 |
| 6,857,896 | B2 * | 2/2005 | Rupert | H01R 13/641 439/489 |
| 6,875,051 | B2 * | 4/2005 | Pizak | H01R 25/003 439/501 |
| 7,497,740 | B2 * | 3/2009 | Mei | H01R 13/514 200/51 R |
| 8,157,574 | B2 * | 4/2012 | Hsiao | H01R 25/003 439/131 |
| 8,226,444 | B2 * | 7/2012 | Chow | H01R 25/003 439/651 |
| 8,335,566 | B2 * | 12/2012 | Muller | A61N 1/3752 607/36 |
| 8,622,756 | B2 * | 1/2014 | Smed | H01R 24/76 439/120 |
| 9,325,130 | B2 * | 4/2016 | Lombardo | H01R 13/514 |
| 9,905,967 | B2 * | 2/2018 | Wang | H01R 35/04 |
| 10,199,783 | B2 * | 2/2019 | Finn | H01R 13/514 |
| 10,608,395 | B1 * | 3/2020 | Chen | H01R 24/78 |
| 10,638,630 | B2 * | 4/2020 | Roberts | A47B 43/00 |
| 10,777,948 | B2 * | 9/2020 | Thaker | H01R 13/514 |
| 2005/0170678 | A1 | 8/2005 | Donahue, IV | |
| 2007/0105414 | A1 * | 5/2007 | Kohen | H01R 35/04 439/120 |
| 2012/0295483 | A1 | 11/2012 | Smed | |
| 2015/0001937 | A1 * | 1/2015 | Wang | G06F 1/16 307/52 |
| 2020/0227874 | A1 * | 7/2020 | Schroeder | H01R 13/642 |

FOREIGN PATENT DOCUMENTS

| | | |
|---|---|---|
| CN | 209516234 U | 10/2019 |
| DE | 29603529 | 6/1996 |

* cited by examiner

MODULAR SYSTEM, COMPRISING ELECTRICAL CONSUMING UNITS AND AN ELECTRICAL CONNECTION UNIT

TECHNICAL FIELD

The invention relates to a modular system, which comprises electrical consuming units as well as an electrical connection unit. More specifically, the invention relates to such a modular system that has the features of electrical consuming units and an electrical connection unit, wherein the electrical connection unit has a contact plug for plugging into an electrical household power outlet and for electrical connection to the electrical household power outlet, an electrical terminal and distribution strip, as well as an electrical cable connecting the electrical terminal and distribution strip to the contact plug, wherein the electrical consuming units have first connection elements for mechanical and electrical connection to second connection elements on the electrical terminal and distribution strip.

BACKGROUND

Background Information

The connecting of various electrical consuming units and/or electrical devices, for example electrical kitchen appliances, such as toasters, coffee machines, kitchen radios, kettles, egg cookers, or the like, to one single household power outlet in households is known, in that one electrical connection unit with an electrical terminal and distribution strip, particularly in the form of a power strip, with a customary electrical connection plug, for example a plug as per the Schuko standard in accordance with CEE 7/4, CEE 7/6, and CEE 7/7, is connected to the household power outlet, and the individual electrical consuming units with their electrical connection plugs are plugged into the individual sockets of the power strip and thus electrical contact is established. This known procedure is problematic in various ways and worthy of improvement:

On one hand, a thusly obtained configuration of electrical contacts and connections is characterized by a large number of electrical cables, which are often not possible to stow in an orderly manner. Electrical connections formed in such a manner for electrical consuming units are thus frequently unsightly and appear messy.

On the other hand, and this is frequently more serious, it is particularly then possible with such a procedure, when the power strip has a large number of individual sockets, to simultaneously connect and operate a multitude of electrical consuming units without considering the maximum amount of connected electrical power compatible for the socket outlet connected to the household power supply in this case. Thus, if consuming units with a high level of electrical power consumption, such as particularly consuming units with a high heat output, for example coffee machines, kettles, toasters, are simultaneously connected to one single household power outlet and additionally operated simultaneously, this can lead to excessively high electric current in the electrical line connected to the electrical household power outlet. In the normal and best-case scenario, this causes a triggering of an electrical fuse, with which the line to the electrical household power outlet is secured. In a worst-case scenario, if this electrical fuse, for example, is defective or does not react correctly, this can also lead to overheating of the electrical line to the household power outlet and thus to the risk of a fire developing.

In this case, the present invention should obtain a remedy, in which a modular system of the aforementioned type is provided that enables, on one hand, a visually appealing and orderly arrangement and a corresponding connection of electrical consuming units to the electrical terminal and distribution strip but, on the other hand, limits the simultaneous connecting of electrical consuming units to the electrical terminal and distribution strip to the extent that a simultaneous connecting of consuming units with a power consumption exceeding a maximum permissible overall electrical power consumption is not possible.

SUMMARY

According to the invention, this object is achieved by means of a modular system, comprising electrical consuming units and an electrical connection unit, wherein the electrical connection unit may have a contact plug for plugging into an electrical household power outlet and for electrical connection to the electrical household power outlet, an electrical terminal and distribution strip, as well as an electrical cable connecting the electrical terminal and distribution strip to the contact plug. The electrical consuming units may have first connection elements for mechanical and electrical connection to second connection elements on the electrical terminal and distribution strip. The first connection elements on the electrical consuming may be geometrically differently designed depending on a maximum electrical power consumption of the respective electrical consuming unit. The second connection elements on the electrical terminal and distribution strip may likewise be designed geometrically different in such a manner that selected of the first connection elements may not be able to be connected to selected ones of the second connection elements. The type and number of the second connection elements provided on the electrical terminal and distribution strip may be determined such that a total maximum electrical power consumption of all electrical consuming units that can be simultaneously connected to the electrical terminal and distribution strip may be limited to a predefined maximum value. Advantageous refinements of such a modular system are that the first and the second of the connection elements may be designed geometrically such that only a suitably fitted one of the first connection elements may be connected to a corresponding second connection element. The electrical consuming units may be divided into groups depending on their maximum electrical power consumption. The electrical consuming units of a group may have geometrically identically shaped first connection elements and the electrical consuming units of different groups may have geometrically differently shaped first connection elements. The first connection elements may further be designed as plug-in sockets, and the second connection elements may be designed as plugs. The electrical consuming units may have a setup surface with a side extension of a contact side supporting the first respective connection element. The side extensions of the setup surfaces of the electrical consuming units may be formed in an integer ratio to one another. A maximum electrical power consumption of all electrical consuming units that can be simultaneously connected to the electrical terminal and distribution strip may be no greater than 3500 W. The electrical consuming units may be electrical kitchen appliances.

With a modular system according to the invention, comprising electrical consuming units and an electrical connection unit, the electrical connection unit first has a contact plug for plugging into an electrical household power outlet and for electrical connection to the electrical household power outlet. The electrical connection unit furthermore has an electrical terminal and distribution strip and an electrical cable connecting the electrical terminal and distribution strip to the contact plug. Furthermore, the electrical consuming units have first connection elements, particularly one first connection element each, for mechanical and electrical connection to second connection elements on the electrical terminal and distribution strip of the electrical connection unit.

The special feature on the modular system according to the invention then is that the first connection elements on the electrical consuming units are designed to be geometrically different depending on a maximum electrical power consumption of the respective electrical consuming unit and that the second connection elements on the electrical terminal and distribution strip are likewise designed geometrically different in such a manner that selected of the first connection elements cannot be connected to selected of the second connection elements. Furthermore, the invention is then characterized in that, with the modular system, the type and number of the second connection elements provided on the electrical terminal and distribution strip are determined in such a manner that an overall maximum electrical power consumption of all electrical consuming units that can be simultaneously connected to the electrical terminal and distribution strip is limited to a predefined maximum value.

With the novel modular system, it is thus particularly provided with the invention that the terminal and distribution strip of the electrical connection unit is thereby limited with respect to the connection of electrical consuming units and a maximum overall electrical power consumption of all connected electrical consuming units, that it has different second connection elements in a predefined number, which specifically can only be combined with first connection elements on such electrical consuming units that do not exceed a predefined maximum electrical power consumption. In other words, an electrical terminal and distribution strip can have, for example, four second connection elements, of which two are designed with the same geometry, accordingly can be connected with a maximum electrical power consumption of, for example, 250 W to corresponding first electrical connection elements on electrical consuming units, of which a further second connection element is formed in a deviating geometric design and fits to a first connection element on such electrical consuming units, which have, for example, a maximum electrical power consumption of 1000 W each and of which a last connection element is formed in yet another deviating geometric shape and fits to the first connection elements on such electrical consuming units, which have, for example, a maximum electrical power consumption of 2000 W. Due to such a measure, the terminal and distribution strip formed specifically for connection to the likewise specifically designed first connection elements of the electrical consuming units of the modular system is limited to the connection of electrical consuming units with a maximum electrical total power consumption of no more than 3500 W; it can correspondingly be assured that the electrical supply line to the household power outlet, to which the electrical connection unit available in the system according to the invention is connected, is not overloaded with overcurrent, even when all the electrical consuming units connected to the terminal and distribution strip are operated simultaneously at the maximum power consumption. Obviously, the invention is not limited to a division, as previously described by example, into different second connection elements on the electrical terminal and distribution strip, and it is also not limited to the maximum total power consumption mentioned by example. In particular, this limitation, and thus also the division into different second connection elements, also depends on the respective configurations of the household electrical power system and on the regulations in different countries in which the system according to the invention will be used. For example, it may be thusly provided to form an electrical connection unit with an electrical terminal and distribution strip such that it has an electrical power consumption of no more than 3680 W (or somewhat lower, e.g. no more than 3500 W), with 230 V/50 Hz voltage supply when it will be used in Germany or in France. This is because the maximum electrical power to be incorporated via a household power outlet is limited to this maximum value in these countries. For an electrical connection unit to be used in the United Kingdom, the electrical terminal and distribution strip, on the other hand, must be advantageously designed such that it has an electrical power consumption of no more than 2990 W (or somewhat lower, e.g. 2800 W), because household power outlets in the United Kingdom are only designed up to a power output of no more than 2990 W. For other countries, other upper limits of the maximum electrical power consumption of the electrical consuming units that can be connected as a whole to the electrical terminal and distribution strip may be provided accordingly. The division of the second connection elements and the maximum electrical power consumption of the electrical consuming units that can be connected to the respective connection element based on the specific geometric design may also vary, of course, and be configured as well based on a corresponding design of the first connection elements in a need-based system according to the invention.

In principle, it is possible for several geometrically differently designed first connection elements to be connected to selected, especially geometrically designed, second connection elements, e.g. those on electrical consuming units that do not exceed a maximum intended electrical power consumption for connection to the particular second connection element.

However, it may also be provided with a modular system according to the invention that the first and second connection elements are designed geometrically such that only a suitably fitted one of the first connection elements can be connected to a corresponding second connection element.

In particular, it may be provided that the first connection elements and the second connection elements may establish contact with one another directly without having to provide cable sections, for example. This leads to a reduction in the frequently commonly resulting tangle of various cables and enables an orderly and visually appealing arrangement and establishing of contact of the individual electrical consuming units.

The concept of the modular system according to the invention is simplified when, as proposed according to an advantageous refinement of the invention, the electrical consuming units are divided into groups depending on their maximum electrical power consumption and, in doing so, when the electrical consuming units of a group have geometrically identically shaped first connection elements, and the electrical consuming units of different groups have geometrically differently shaped first connection elements. With such a solution, electrical consuming units, for example, with a maximum electrical power consumption of up to 250 W are divided into a first group and independently of their actual maximum electrical power consumption each have identically shaped first connection elements. A second group of electrical consuming units may be formed, for example, by means of those with a maximum electrical power consumption of greater than 250 W to 1000 W and may have first connection elements in a geometric shape and deviating from the first. A third group of electrical consuming units, which have connection elements again with a design deviating from both geometric shapes of the connection elements of the electrical consuming units of the first two groups, may then comprise, for example, those electrical consuming units having a maximum electrical power consumption of from 1000 W to 2000 W. The respective upper limit of the electrical power consumption of the electrical consuming units in the respective group is then used for the selection of the number and respective type of the second connection elements, which are provided on the electrical terminal and distribution strip, by means of a maximum permissible total electrical power consumption of all connected and possibly simultaneously operated electrical consuming units. The previously given examples of a subdivision of the electrical consuming units into three groups, for example, with the aforementioned exemplary divisions with respect to the maximum electrical power consumption are obviously only examples and may also be designed differently. Thus, more than three groups, optionally also only two groups, can be formed, and the limits of the maximum electrical power consumption of the consuming units may also be set differently in the respective groups.

Essentially, the first and the second connection elements on the electrical consuming units and/or on the terminal and distribution strip may have a freely selectable design. However, it is especially preferable when one type of these connection elements, for example the first connection elements, are formed as connector plugs, and a second type, for example the second connection elements, are formed as plug-in sockets. The different geometric design may be formed, for example, by strip-shaped bars on the plugs and corresponding mounting grooves in the plug-in sockets, which are arranged and formed such that it is only possible to connect a plug of a given geometric shape to a correspondingly fitted plug-in socket.

In a further possible design of the modular system according to the invention, it may be provided that the electrical consuming units have a setup surface with a side extension of a contact side supporting the first respective connection element and that the side extension of the setup surfaces of the electrical consuming units are formed in an integer ratio to one another. Such a design enables a simple, particularly clearance-free, modular combining of electrical consuming units set up next to one another, which can be connected to correspondingly positioned second connection elements on the terminal and distribution strip. Such a modular unit constructed of various consuming units can then be further unified when the setup surfaces preferably have a rectangular or quadratic basic shape with an extension in the transverse direction, particularly perpendicular to the side extension, which is the same for the respective modules. Particularly then, as is provided by an advantageous refinement of the invention, when the electrical consuming units are electrical kitchen appliances such as, for example, toasters, kettles, coffee machines, egg cookers, kitchen radios, blenders, juicers, or the like, a compactly formed row of electrical consuming units is formed, which are arranged next to one another and have electrical contact via the terminal and distribution strip, specifically electrical kitchen appliances in this case, which are also arranged in a visually appealing and space-saving manner, for example on a working surface in a kitchen and are connected to a single household power outlet, particularly via a single supply cable, namely the electrical cable of the connection unit, by means of the connection unit formed according to the invention.

Advantageously, the maximum electrical power consumption of all electrical consuming units that can be connected simultaneously to the electrical terminal and distribution strip cannot be greater than 3500 W; thus, the second contact elements arranged on the electrical terminal and distribution strip can be accordingly selected with respect to the number and type thereof such that the electrical consuming units that can be connected to first connection elements fitting only one type of the second connection elements do not exceed in total a maximum power consumption of this amount. In such a design, the system according to the invention is especially suitable for use in Germany or France.

BRIEF DESCRIPTION OF THE SEVERAL VIEWS OF THE DRAWINGS

Further advantages and features of the inventions result from the following description of an exemplary embodiment by means of the enclosed figures. The following is shown.

DETAILED DESCRIPTION

The two enclosed figures schematically show a possible exemplary embodiment of a modular system according to the invention, comprising electrical consuming units and an electrical connection unit, with the representation in no way being true to scale or true to design. In this case, the representation in the figures should not be considered limiting but only useful as explanation. A modular system according to the invention may also be implemented in deviating design variants that are also easily recognizable to one skilled in the art. Also only by example and not to be considered limiting is the information regarding the electrical power consumption of a single one of the aforementioned electrical consuming units, the classification of the first and the second connection elements in the graphic design thereof into groups according to the electrical power consumption in the aforementioned limits, the aforementioned limits, and also the resulting maximum configuration of electrical consuming units to be combined in the system and that can be simultaneously connected to a household power outlet, and the resulting maximum electrical power consumption when these consuming units are operated simultaneously. These values are determined and configured by one skilled in the art particularly by means of the framework conditions required in the specific case such as, e.g., the type of electrical consuming units or the country in which the system will be used, and the requirements for the electrical supplying and securing of household power outlets in the country.

Figure 1:
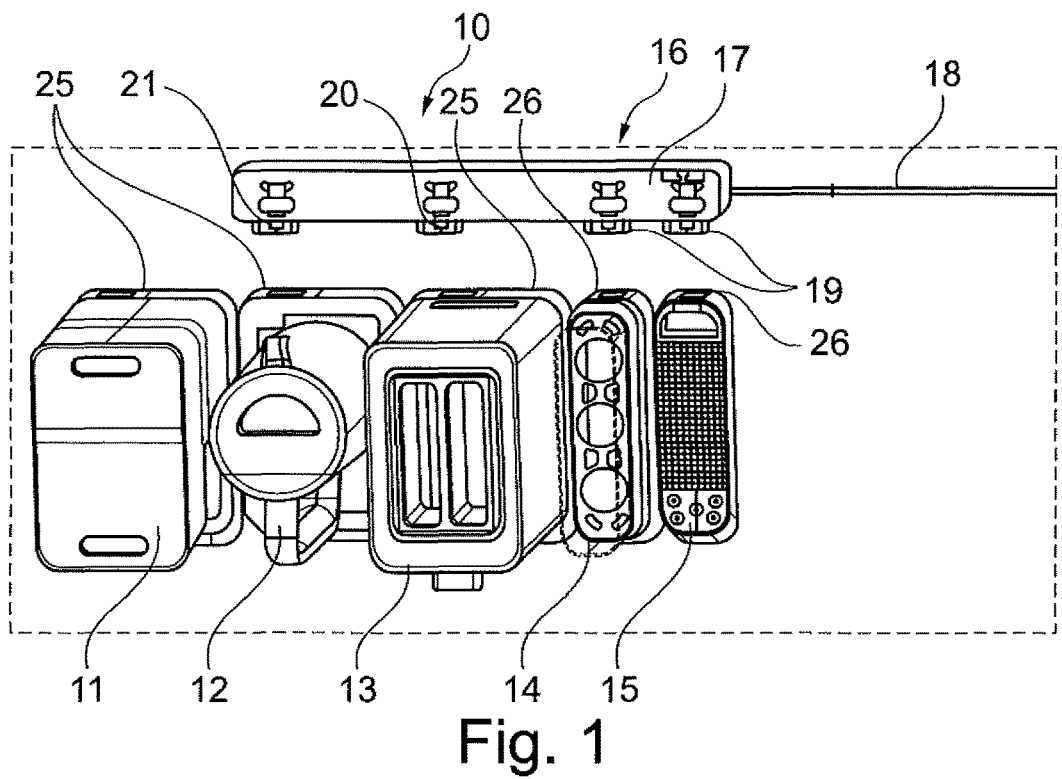
FIG. 1 a schematic view of a modular system according to the invention in a first perspective.
Figure 2:
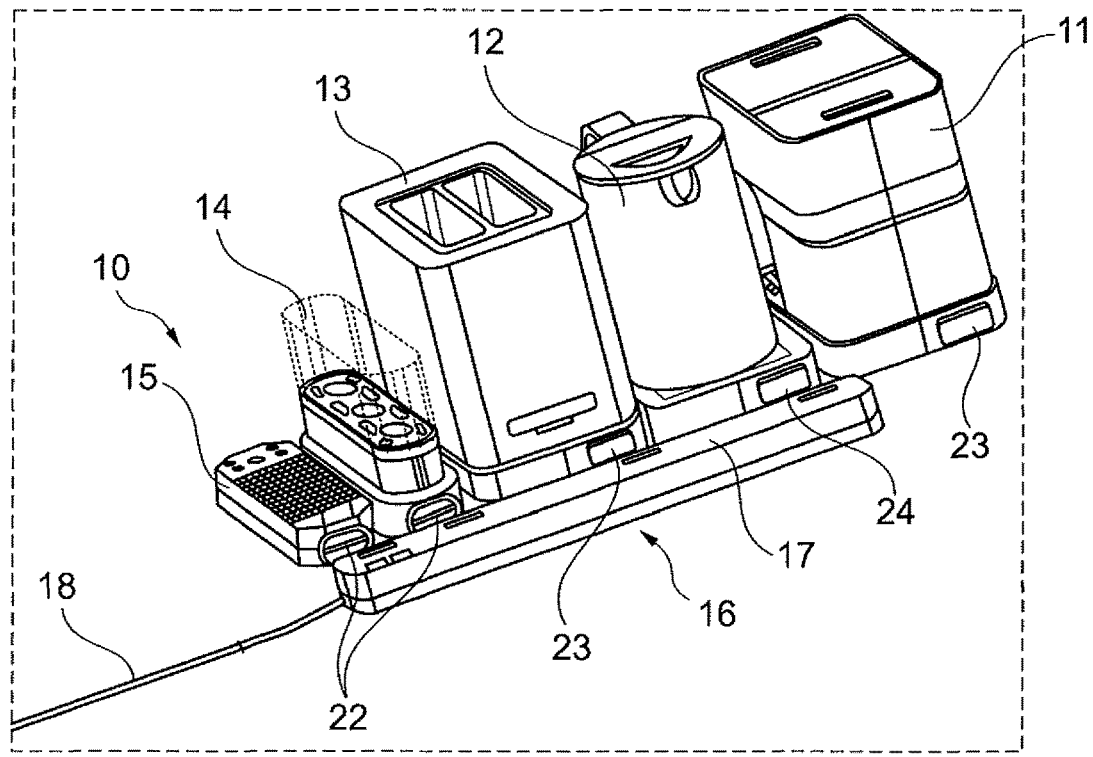
FIG. 2 a schematic view of the modular system from FIG. 1 in a second perspective.

The figures characterize a modular system according to the invention generally with reference numeral 10, in two different angles, a top view in FIG. 1 and a diagonal view from above and from the rear in FIG. 2. The system 10 contains several electrical consuming units; in the exemplary embodiment shown, these are electrical kitchen appliances in the form of a coffee machine 11, a kettle 12, a toaster 13, an egg cooker 14, and a kitchen radio 15. The system 10 further contains an electrical connection unit 16, which is formed from an electrical terminal and distribution strip 17, which is connected to a customary electrical connection plug (not shown) for connecting to a household power outlet via an electrical cable 18.

In the exemplary embodiment shown, the electrical terminal and distribution strip 17 has a total of four, second connection elements in the form of connector plugs 19, 20, 21. In this case, the connector plugs 19 have an identical geometrical shape; however, the geometry differs from connector plugs 20 and 21, which are likewise formed with a geometry deviating from one another.

The electrical consuming units (coffee machine 11, kettle 12, toaster 13, egg cooker 14, and kitchen radio 15) each have first connection elements in the form of plug-in sockets 22, 23, 24. In this case, the plug-in sockets 22 are geometrically shaped such that they can be connected to and establish electrical contact with all connector plugs 19, 20, 21. Plug-in sockets 23 fit exclusively with connector plugs 20, 21 but not with connector plugs 19. Plug-in socket 24 is geometrically shaped such that it can only be combined and have contact with connector plug 21.

This different geometrical design of plug-in sockets 22, 23, 24 is undertaken by means of a grouping of the electrical consuming units having said plug-in sockets, which are determined according to their maximum electrical power consumption. In a first group, which includes the kitchen radio 15 and the egg cooker 14, the devices have a low maximum electrical power consumption of about 250 W, for example. A second group, which includes the toaster 13 and coffee machine 11, comprises devices with an average maximum electrical power consumption of about 1000 W (coffee machine 11) or about 900 W (toaster 13), for example. The third group only includes the kettle, which has a high maximum electrical power consumption of about 2000 W, for example. Thus, the electrical terminal and distribution strip 17, with its four connector plugs 19, 20, 21, is designed such that a total of electrical consuming units with a maximum electrical total power consumption of about 3500 W can be connected to said connector plugs. This is determined, on one hand, by the number of connector plugs 19, 20, 21 arranged on the electrical terminal and distribution strip 17 as well as by the respective geometric design thereof, which enables a connection only to fitted plug-in sockets 22, 23, 24 of the respectively assigned electrical consuming units from the previously indicated groups, wherein plug-in sockets 22 on consuming units with low electrical power consumption can be connected to connector plugs 19 specifically designed for the connection of such consuming units consuming low electrical power but also to plug-in sockets 20 and 21 provided for the connection of consuming units with a higher (average or higher) power consumption. Electrical consuming units with a higher power consumption, on the other hand, with their connecting sockets 23, 24 cannot be connected to connector plugs 19 for electrical consuming units with low maximum electrical power consumption.

The figures show a total of five electrical consuming units, which are electrical kitchen appliances here. This is intended to illustrate that a modular setup and a modular combination is possible in the system. Thus, for example, the egg cooker 14 and the kitchen radio 15 can be connected to the two connector plugs 19 of the electrical terminal and distribution strip 17. For example, the toaster 13 can be connected to the connector plug 20, but also alternatively the coffee machine 11 can be connected because it belongs to the same power group with respect to grouping and thus has an identical plug-in socket 23. However, the egg cooker 14 or the kitchen radio 15 may also be connected to the connector plug 20, because these electrical consuming units have a lower maximum power consumption as compared to the toaster 13 or the coffee machine 11. Only connector plug 21 enables a connection to the kettle 12, which has the highest maximum electrical power consumption. However, all other devices, i.e. coffee machine 11, toaster 13, egg cooker 14, kitchen radio 15, can be connected to connector plug 21. In some cases, it may also be provided that the kettle 12 can also be connected to connector plug 20. This may particularly be the case when only one consuming unit with a high electrical power consumption, such as the kettle 12, is present in total in the system such that it is already not possible to connect a further consuming unit with such a high electrical power consumption to connector plug 21 and to thus obtain an excessively high overall power consumption. With such a design, a higher degree of freedom of possible positioning of the kitchen appliances 11, 12, 13, 14, 15 can then be obtained.

A special feature of the combination of the system 10 according to the invention shown in the exemplary embodiment is the fact that the respective end consuming units in the form of the electrical kitchen appliances (coffee machine 11, kettle 12, toaster 13, egg cooker 14, kitchen radio 15) have substantially rectangular setup surfaces 25, 26, wherein the setup surfaces 25 of the coffee machine 11, kettle 12, toaster 13 have an identical side extension along the edge thereof, in which the respective plug-in socket 23, 24 is arranged. The setup surfaces 26 of the egg cooker 14 and kitchen radio 15 are likewise formed similarly but have a side extension that is shorter than the other kitchen appliances along the particular edge at which they have their plug-in sockets 22. In this case, the side extension of setup surfaces 26 amounts to precisely half of the side extension of setup surfaces 25. The setup surfaces 25, 26 are formed of equal length in the direction perpendicular to the side extension. A compact row of kitchen appliances arranged without clearance next to one another can thereby be formed, which can have contact established via the terminal and distribution strip 17.

It should be noted here again that the information indicated in the previous description of an exemplary embodiment regarding the power consumption of the electrical consuming units mentioned by example are merely exemplary and are only intended to further illustrate the invention.

Of course, other types of electrical consuming units with different power consumption levels or, as previously mentioned, electrical consuming units in the form of electrical kitchen appliances with different power consumption levels can be used without deviating from the invention. Thus, for example, a kettle 12 cannot consume 2000 W of electrical power but only, for example, 1900 W or 1800 W or other values, possibly even higher or lower values between those previously mentioned. The same thing applies similarly as well to the other electrical kitchen appliances, toaster 13, coffee machine 11, egg cooker 14, and kitchen radio 15 listed in the previous example.

LIST OF REFERENCE NUMERALS

10 System
11 Coffee machine
12 Kettle
13 Toaster
14 Egg cooker
15 Kitchen radio

16 Electrical connection unit
17 Electrical terminal and distribution strip
18 Electrical cable
19 Connector plug
20 Connector plug
21 Connector plug
22 Plug-in socket
23 Plug-in socket
24 Plug-in socket
25 Setup surface
26 Setup surface

The invention claimed is:

1. A modular system, comprising:
    electrical consuming units; and
    an electrical connection unit, wherein the electrical connection unit has:
        a contact plug for plugging into an electrical household power outlet and for electrical connection to the electrical household power outlet, an electrical terminal, and a distribution strip;
        an electrical cable connecting the electrical terminal and distribution strip to the contact plug, wherein the electrical consuming units have first connection elements for mechanical and electrical connection to second connection elements on the electrical terminal and distribution strip; and
        wherein the first connection elements on the electrical consuming units are geometrically differently designed depending on a maximum electrical power consumption of the respective electrical consuming unit;
        wherein the second connection elements on the electrical terminal and distribution strip are likewise designed geometrically different in such a manner that selected of the first connection elements cannot be connected to selected of the second connection elements;
        wherein the type and number of the second connection elements provided on the electrical terminal and distribution strip are determined such that a total maximum electrical power consumption of all electrical consuming units that are simultaneously connected to the electrical terminal and distribution strip is limited to a predefined maximum value; and
        wherein the limitation of the power consumption to the predefined maximum value is accomplished via possible appliance connections provided by a distribution of different second connection elements on the electrical terminal and distribution strip.

2. The modular system according to claim 1, wherein the first connection elements and the second connection elements are designed geometrically such that only a suitably fitted one of the first connection elements is connectable to a corresponding second connection element.

3. The modular system according to claim 1, wherein the electrical consuming units are divided into groups depending on their maximum electrical power consumption, wherein the electrical consuming units of a group have geometrically identically shaped first connection elements, and the electrical consuming units of different groups have geometrically differently shaped first connection elements.

4. The modular system according to claim 1, wherein the first connection elements are designed as plug-in sockets, and the second connection elements are designed as plugs.

5. The modular system according to claim 1, wherein the electrical consuming units each have a setup surface with a side extension of a contact side supporting a respective first connection element and the side extensions of the setup surfaces of the electrical consuming units are formed in an integer ratio to one another.

6. The modular system according to claim 1, wherein the maximum electrical power consumption of all electrical consuming units that are simultaneously connected to the electrical terminal and distribution strip is no greater than 3500 W.

7. The modular system according to claim 1, wherein the electrical consuming units are electrical kitchen appliances.

8. A modular system, comprising:
    an electrical connection unit including a contact plug for plugging into an electrical household power outlet and for electrical connection to the electrical household power outlet, an electrical terminal, and a distribution strip;
    an electrical cable connecting the electrical terminal and distribution strip to the contact plug;
    first electrical consuming units which consume electrical power, wherein each of the first electrical consuming units includes a first connection element of a first geometry;
    second electrical consuming units which consume high electrical power relative to the first electrical consuming units, wherein each of the second electrical consuming units includes a first connection element of a second geometry, wherein the second geometry is different from the first geometry;
    a first group of second connection elements provided on the electrical terminal and distribution strip, wherein the first group of second connection elements is only compatible with first connection elements of the first geometry;
    a second group of second connection elements provided on the electrical terminal and distribution strip, wherein the second group of second connection elements is only compatible with first connection elements of the second geometry;
    wherein a total maximum electrical power consumption of all electrical consuming units simultaneously connected to the electrical terminal and distribution strip is limited to below a predefined maximum value by providing, on the electrical terminal and distribution strip, a first number of the first group of second connection elements and a second number of the second group of second connection elements.

9. A modular system, comprising:
    electrical consuming units; and
    an electrical connection unit, wherein the electrical connection unit has:
        a contact plug for plugging into an electrical household power outlet and for electrical connection to the electrical household power outlet, an electrical terminal, and a distribution strip;
        an electrical cable connecting the electrical terminal and distribution strip to the contact plug, wherein the electrical consuming units have first connection elements for mechanical and electrical connection to second connection elements on the electrical terminal and distribution strip; and
        wherein the first connection elements on the electrical consuming units are geometrically differently designed depending on a maximum electrical power consumption of the respective electrical consuming unit;
        wherein the second connection elements on the electrical terminal and distribution strip are likewise designed geometrically different in such a manner that selected of the first connection elements cannot be connected to selected of the second connection elements;

wherein the type and number of the second connection elements provided on the electrical terminal and distribution strip are determined such that a total maximum electrical power consumption of all electrical consuming units that are simultaneously connected to the electrical terminal and distribution strip is limited to a predefined maximum value; and wherein a type and number of the second connection elements on the electrical terminal and distribution strip are selected to ensure that a total maximum electrical power consumption of all electrical consuming units simultaneously connectable to the electrical terminal does not exceed a predefined maximum value.

* * * * *